US008175650B2

(12) United States Patent
Colson et al.

(10) Patent No.: US 8,175,650 B2
(45) Date of Patent: *May 8, 2012

(54) PROVIDING TELEPHONE SERVICES BASED ON A SUBSCRIBER VOICE IDENTIFICATION

(75) Inventors: Vicki Colson, Tavernier, FL (US); Brent Davis, Deerfield Beach, FL (US); Peeyush Jaiswal, Boca Raton, FL (US); Victor S. Moore, Lake City, FL (US)

(73) Assignee: International Business Machines Corporation, Armonk, NY (US)

(*) Notice: Subject to any disclaimer, the term of this patent is extended or adjusted under 35 U.S.C. 154(b) by 566 days.

This patent is subject to a terminal disclaimer.

(21) Appl. No.: 12/347,190

(22) Filed: Dec. 31, 2008

(65) Prior Publication Data

US 2009/0110168 A1  Apr. 30, 2009

Related U.S. Application Data

(63) Continuation of application No. 10/324,913, filed on Dec. 20, 2002, now Pat. No. 7,493,145.

(51) Int. Cl.
H04B 1/38 (2006.01)
(52) U.S. Cl. ............ 455/563; 379/88.01; 704/246
(58) Field of Classification Search ........... 379/88.02, 379/201.02, 207.13, 201.12, 221.11, 230; 455/563; 704/246
See application file for complete search history.

(56) References Cited

U.S. PATENT DOCUMENTS

| 5,818,930 | A | 10/1998 | Mark |
| 5,940,476 | A | 8/1999 | Morganstein et al. |
| 5,991,617 | A | 11/1999 | Powell |
| 5,999,611 | A | 12/1999 | Tatchell et al. |
| 6,038,305 | A * | 3/2000 | McAllister et al. ...... 379/201.02 |
| 6,144,723 | A | 11/2000 | Truchon et al. |
| 6,154,727 | A | 11/2000 | Karp et al. |
| 6,188,751 | B1 | 2/2001 | Scherer |
| 6,246,988 | B1 | 6/2001 | Schier |
| 6,266,399 | B1 | 7/2001 | Weller et al. |
| 6,327,347 | B1 | 12/2001 | Gutzmann |
| 6,456,698 | B1 | 9/2002 | Morganstein et al. |
| 6,839,410 | B2 * | 1/2005 | Infosino ...................... 379/88.02 |
| 6,871,064 | B1 | 3/2005 | Holt et al. |
| 2003/0179865 | A1 | 9/2003 | Stillman et al. |

* cited by examiner

Primary Examiner — Lana N Le
Assistant Examiner — Golam Sorowar
(74) Attorney, Agent, or Firm — Novak Druce + Quigg LLP

(57) ABSTRACT

A method of providing a telephony service can include creating a database of subscriber identities and subscriber voice prints and telephony services associated with the subscriber identities and receiving a spoken utterance from a subscriber. A subscriber identity can be determined according to voice print identification of the spoken utterance and a telephony service associated with the subscriber can be activated according to the determined subscriber identity.

6 Claims, 2 Drawing Sheets

PROVIDING TELEPHONE SERVICES BASED ON A SUBSCRIBER VOICE IDENTIFICATION

CROSS REFERENCE TO RELATED APPLICATIONS

This application is a continuation of, and accordingly claims the benefit of, U.S. patent application Ser. No. 10/324,913, filed with the U.S. Patent and Trademark Office on Dec. 20, 2002, now U.S. Pat. No. 7,493,145, the disclosure of which is hereby incorporated by reference.

BACKGROUND OF THE INVENTION

1. Technical Field

This invention relates to the field of telephony and, more particularly, to providing telephony services to subscribers.

2. Description of the Related Art

The delivery of most telephony services and features are tied to the directory number of a calling party or a called party. In fact, nearly all of the activities performed by a conventional telephony system, whether the public switched telephone network (PSTN) or an Internet protocol (IP) telephony system, are based on such directory numbers. The dialed directory number can be referred to as the DNIS in reference to directory number identification service, a service which identifies for a receiving party the number dialed by a calling party. The directory number of the calling party can be referred to as an ANI in reference to automatic number identification, the service which provides the receiving party with the directory number of the calling party.

For example, when a calling party initiates a call to a receiving party, the DNIS and the ANI can be used to authenticate the call. Authentication can include tasks such as finding the ANI in a list of authorized subscribers and ensuring that the DNIS is valid. Taking another example, the switching of calls to and from a subscriber also can be achieved through the use of the subscriber's directory number. That is, if a calling party places a call to a receiving party, the call can be routed to the receiving party based on an area code and/or an exchange code of the DNIS.

The reliance of conventional telephony systems on the DNIS and ANI not only determines how features and services are to be implemented and delivered, but also can dictate the mode of operation of other major portions of the telephony system. In illustration, telephony billing systems are largely based upon the directory number of a subscriber. Given the mobile nature of today's society, however, billing subscribers according to their directory number may not be the most efficient billing method available. For example, as a subscriber moves from one location to another, the subscriber may utilize telephony equipment associated with a directory number that is different from that of the "mobile" subscriber. Yet conventional telephony systems continue to link the delivery of telephony services with directory numbers.

SUMMARY OF THE INVENTION

The invention disclosed herein provides a solution for activating telephony services based upon identifying information which can be provided by the subscriber. One aspect of the present invention can include a method of providing a telephony service. The method can include creating a database of subscriber identities and subscriber voice prints and telephony services associated with the subscriber identities. A spoken utterance can be received from a subscriber. A subscriber identity can be determined according to voice print identification of the spoken utterance. For example, the determining step can include performing voice print identification to determine identifying information from the spoken utterance. The identifying information from the spoken utterance can be matched with a subscriber voice print from the database. One or more telephony services can be identified which are associated with the matched subscriber voice print from the database. A telephony service associated with the subscriber can be activated according to the determined subscriber identity. Thus, the identifying information can specify the activated telephony service.

Another aspect of the present invention can include a telephony service delivery system. The system can include an interface configured to receive call information having signaling information and a spoken utterance from a subscriber. The interface can be configured to receive the call information from a telephony system and provide the call information to at least one other device communicatively linked through a computer communications network. The system also can include a database of subscriber identities and subscriber voice prints and telephony services associated with the subscriber identities as well as an audio processor for determining a subscriber identity from the spoken utterance through voice print identification. The audio processor can include a voice recognizer for identifying a voice of the subscriber according to the spoken utterance as well as a speech recognizer. Additionally, the system can include a telephony application server configured to activate one or more telephony services according to the subscriber identity.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a solution for activating telephony services for subscribers. In particular, the present invention can obtain a spoken utterance from a caller through an audio interface. A database of subscriber identities, associated subscriber voice prints, and subscriber telephony services can be created. Voice print identification processing techniques can be applied to the spoken utterances to uniquely identify the caller. The identifying information can be used to activate one or more telephony services for processing the call, initiating other calls, implementing voice mail, and the like. Although the present invention can be configured to allow callers to request services through the audio interface, telephony services can be associated with particular user identities, thereby allowing telephony services to be automatically implemented upon identification of the caller.

Figure 1:
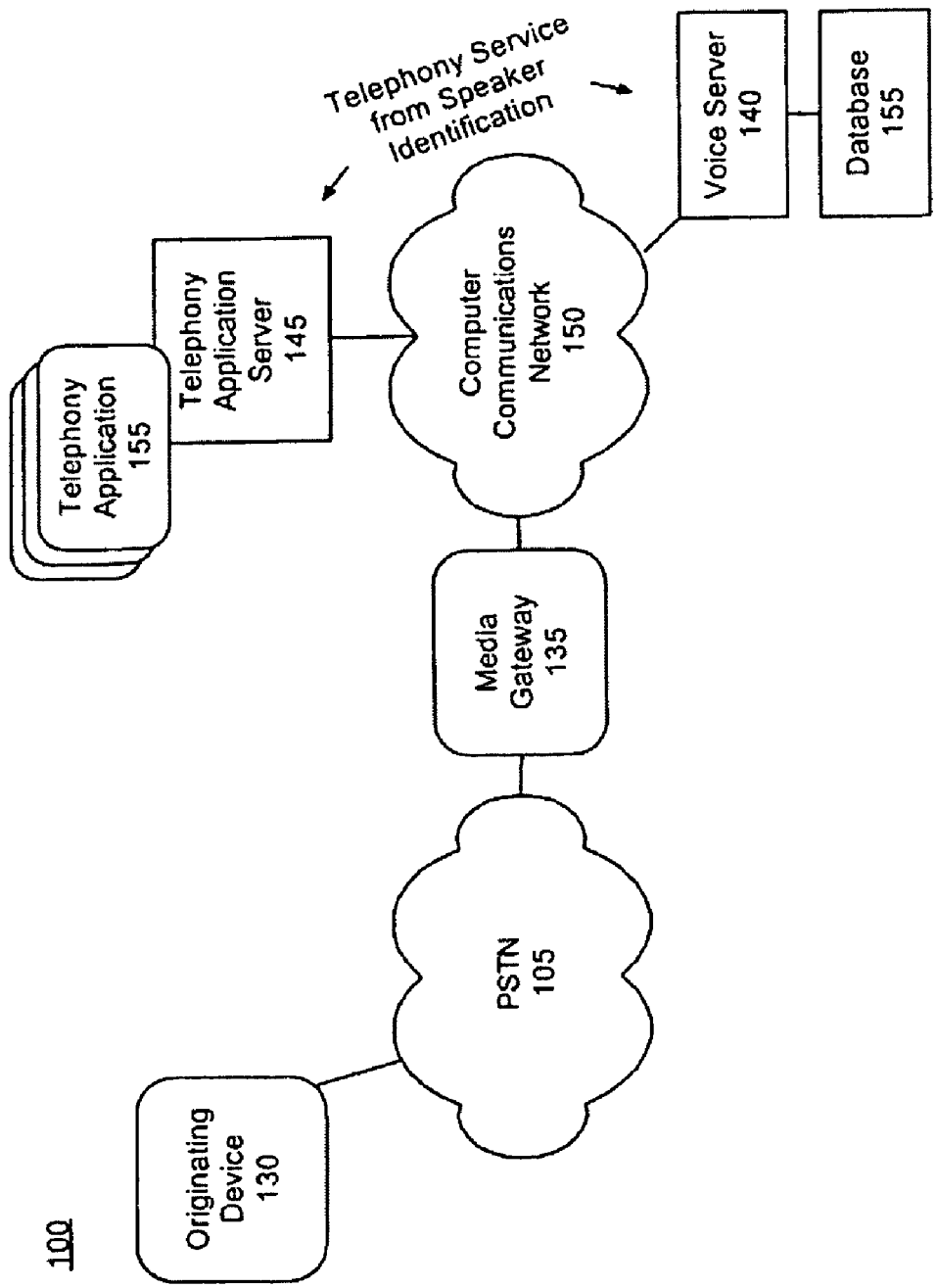
FIG. 1 depicts a telephony system in accordance with the inventive arrangements disclosed herein.

FIG. 1 depicts a telephony system 100 in accordance with the inventive arrangements disclosed herein. The system 100 can include a circuit switched telephony network such as the public switched telephone network (PSTN) 105 and a packet switched communications network 150. The PSTN 105 can include various nodes providing circuit switched transfer of voice data and packet switched transfer of telephony signaling data. The PSTN 105 can be communicatively linked to the computer communications network 150 through a protocol translating network device such as a media gateway 135 for example.

The media gateway 135 can receive voice data and telephony signaling data from the PSTN 105. Thus, the media gateway 135 can receive calls from the PSTN 105, for example over one or more T1 links, and convert or packetize the voice and signaling data received from the PSTN 105 for communication over the computer communications network 150. Similarly, the media gateway 135 can receive voice data and telephony signaling information from the computer communications network 150 and format convert the voice data and telephony signaling data for transmission over the PSTN 105. For example, the media gateway 135 can format voice data for transmission over a packet switched data link using Real Time-Transport Protocol, while telephony signaling information can be formatted for transmission over a packet switched communication link using JAVA Remote Method Invocation (RMI) over Internet Inter-Orb Protocol (IIOP) to deliver Common Object Request Broker Architecture (CORBA) distributed computing capabilities. Still, any communication protocols suited for audio and telephony signaling data can be used and the present invention is not limited to the use of one or more particular communication protocols.

The computer communications network 150 can be a packet-switched network, for example, a local area network (LAN), a wide area network (WAN), the Internet, or the like. Accordingly, the computer communications network 150 can communicatively link the media gateway 135 with a telephony application server 145, and a voice server 140. For example, the media gateway 135, the telephony application server 145 and the voice server 140 can communicate with one another using Internet Protocol (IP) and/or Transmission Control Protocol over IP (TCP/IP). Still, as noted, the invention is not so limited by the particular communications protocol used.

The telephony application server 145 can include one or more telephony applications 155 (services). For example, the telephony services can include, but are not limited to, voice activated dialing, directory number translation, voice mail services, billing related services, and the like. The voice server 140 can provide voice processing features such as a speech recognition engine for recognizing speech and a voice processing system for matching a subscriber voice to a known subscriber voice profile, a text-to-speech system for converting text to an audio stream, as well as an audio playback system. The voice server 140 can be communicatively linked to a database 155. The database 155 can store subscriber identities, associated subscriber voice prints, and references to associated subscriber telephony services.

In operation, the database 155 can be created with subscriber identities, associated subscriber voice prints, and references to subscriber telephony services. A subscriber can originate a call using an originating device 130. The call can be routed through the PSTN 105 to the media gateway 135, through the computer communications network 150 and eventually to the voice server 140. By engaging the subscriber in dialog, the voice server 140 can obtain speech from the subscriber.

From the subscriber's speech, information capable of uniquely identifying the subscriber can be determined. For example, the speech can be provided from the media gateway 135 to the voice server 140 for voice identification. The voice identification results can be used by the voice server 140 to implement an interactive voice response service or can be forwarded to the telephony application server 145. The telephony application server 145 can utilize the voice identification results to activate a telephony application or service 155 for processing the received call.

Figure 2:
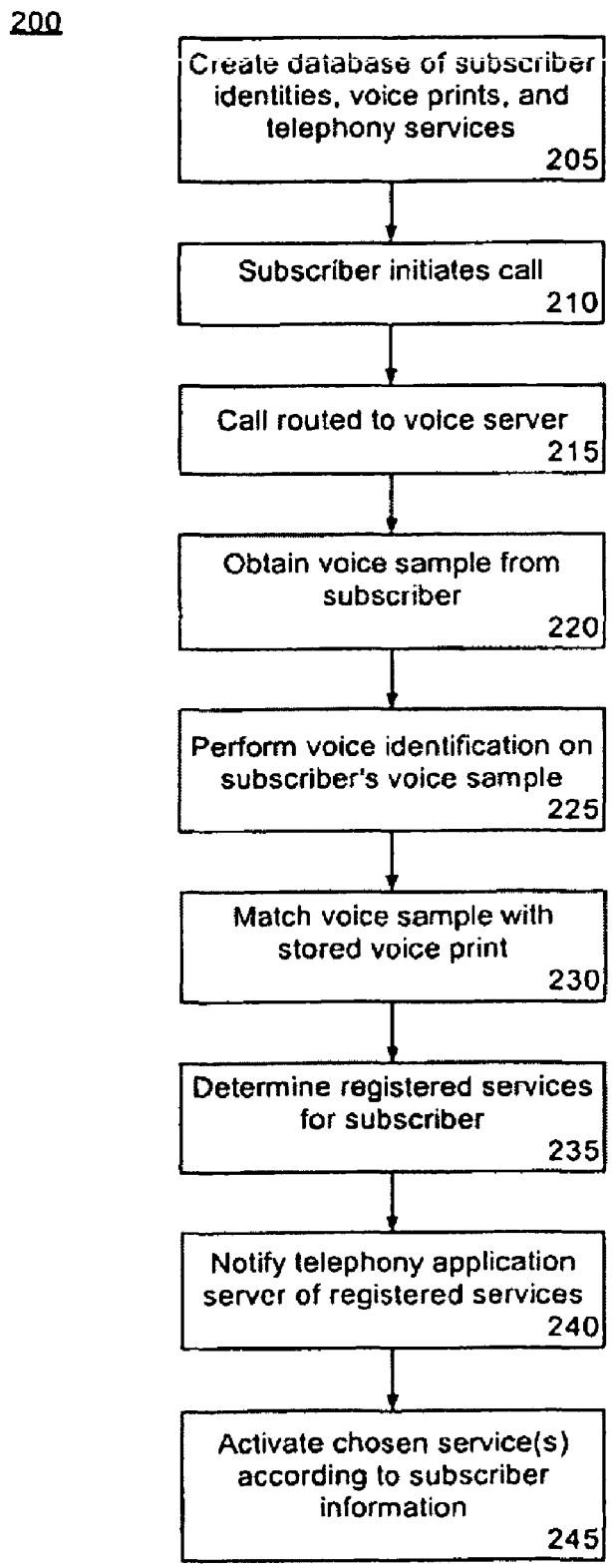
FIG. 2 is a flow chart illustrating a method of delivering a telephony service as performed by the system of FIG. 1.

FIG. 2 is a flow chart illustrating a method 200 of delivering a telephony service as performed by the system of FIG. 1. In step 205, a database of subscriber identities, associated voice prints, and associated telephony services can be created. A voice print is an audio profile of the subscriber's voice which uniquely identifies the subscriber. Any suitable method of analyzing the voice to identify voice parameters of subscribers, that is determine identifying characteristics of a voice sample and perform speaker verification, can be utilized. Accordingly, the database can include entries for each registered subscriber which associates that subscriber with a voice print and one or more telephony services for which the subscriber has been registered.

In step 210, a subscriber can initiate a call. Switching systems within the PSTN can determine that the called number specified by the call is to be routed to the media gateway. Accordingly, the call can be routed to the media gateway, which can translate the called number to a network address, for instance one that corresponds to the voice server. For example, the subscriber can call a predetermined access number through which the subscriber can gain access to one or more telephony services which are associated with the identity of the subscriber rather than the called and/or calling number of the call. Notably, although the present invention has been described with reference to a subscriber initiating a call from the PSTN, the subscriber also can initiate a call/ from an originating device communicatively linked to the computer communications network. In any case, the call, whether originating from the PSTN or the computer communications network, can be routed to the voice server in step 215.

In step 220, a spoken utterance or voice sample can be obtained from the subscriber. Notably, as the present invention relies upon voice print technology to identify a subscriber, the user can be prompted with a general audio prompt rather than engaging the user in a structured dialog to obtain specific information. For example, depending upon the particular voice print technology used, the user can provide a consistent voice sample, that is speak a predetermined phrase that is consistent or the same as the voice sample which the voice server has stored therein for purposes of determining a voice print match. Alternatively, the subscriber can provide random speech as the sample which can be matched to the stored voice print. Still, the subscriber can be engaged in a structured dialog by the voice server to obtain or instruct the user to provide specific phrases for purposes of performing speaker identification.

In step 225, the subscriber's voice response can be processed by the voice server, and particularly by the voice processor, to uniquely identify the subscriber. The voice server can perform a voice print identification upon the received subscriber spoken utterance or voice sample. That is, the voice server can perform an acoustic analysis upon the received subscriber speech to derive or determine a voice profile or voice parameters that can uniquely identify the subscriber. For example, the voice processor can apply feature warping, speaker model synthesis, or Gaussianization techniques to perform speaker identification. The present invention, however, is not limited by the particular speaker identification technique used. The aforementioned examples of speaker identification techniques are for purposes of illustration only and should not be construed as a limitation of the present invention.

In step 230, the voice server can perform a comparison of the voice sample with the voice prints stored within the database. For example, the voice parameters derived from the voice sample which can uniquely identify the subscriber can be compared with the listing of voice prints stored within the database of subscribers, voice prints, and associated telephony services. The voice server can determine a voice print which matches the voice parameters of the voice sample.

In step 235, after a voice print match is determined, one or more telephony services can be determined from the database entry. In particular, as the stored voice print is associated with one or more telephony services, or references to services, for which the subscriber has been registered, those telephony services can be determined. In general, the database entry specifies a subscriber profile of telephony services. Accordingly, the particular telephony service for which the subscriber has been registered can be provided to the telephony application server. That is, the voice server can send a message to the telephony application server indicating which telephony services should be activated or enabled for the subscriber. Notably, the voice server also can implement one or more telephony services, and in particular voice processing services, according to information determined by the voice print match.

In step 245, the telephony services indicated by the voice server can be activated or made available to the subscriber. The telephony services in the telephony application server are linked to the subscriber through a subscriber profile in the subscriber database. Accordingly, by matching the subscriber identity, the subscriber can be linked to one or more telephony services to which the subscriber has been associated or registered through his or her profile. For example, fees accrued during a telephone call can be charged to an account which corresponds to the subscriber making the call rather than the account associated with the number or network address from which the subscriber has called. The telephony services can remain active or accessible to the subscriber for the duration of the call.

If the subscriber specified a telephony service, that service also can be implemented. For example, in the case where the subscriber specifies or requests a telephony service by issuing an appropriate voice response or command, or where the subscriber was queried as to which telephony service to activate, the subscriber specified telephony service can be activated.

The invention disclosed herein provides a solution for activating telephony services for subscribers according to information which is provided by the subscriber. The information can be provided through a voice or speech interface. By implementing telephony services according to subscriber identity, telephony services can be provided on a more personalized basis. Moreover, billing services can be can be simplified in that subscribers can be billed for services according to those services which the subscriber has utilized rather than charging the directory number from which the subscriber accessed those telephony services. The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A telephony service delivery system comprising:
a telephony system for receiving a phone call from a subscriber from an originating device connected to a public switched telephone network connected to the computer communications network via a media gateway;
a media gateway for translating a called number to a network address and for packetizing a voice sample received from the subscriber over the public switched telephone network for communication over the computer communications network;
a switching system within the public switched telephone network for determining that the phone call is to be routed to the media gateway based on the called number specified by the phone call;
an interface configured to receive call information comprising signaling information and a spoken utterance from the subscriber, said interface configured to receive said call information from the telephony system and provide said call information to at least one other device communicatively linked through a computer communications network;
a database of subscriber identities and subscriber voice prints and telephony services associated with said subscriber identities created within a computer communications network;
an audio processor for identifying a voice print uniquely identifying the subscriber from the spoken utterance for determining a subscriber identity from said identified voice print by comparing the identified voice print with the subscriber voice prints stored in the database; and
a voice server connected to the computer communications network and configured to activate during a telephone call in which said subscriber participates at least one telephony service according to said subscriber identity and to charge a fee for the telephony service activated during the telephone call, the fee being charged to an account associated with said subscriber according to said determined subscriber identity during a telephone call in which said subscriber participates, activating a telephony service executing on the voice server, and the telephony service being activated in response to the determining of the subscriber identity based upon the voice print identification.

2. The system of claim 1, wherein said audio processor comprises a voice recognizer for identifying a voice print of said subscriber according to said spoken utterance.

3. The system of claim 2, wherein said audio processor comprises a speech recognizer.

4. A non-transitory computer-readable storage, having stored thereon a computer program having a plurality of code sections executable by a machine for causing the machine to perform the steps of:

creating, within a computer communications network, a database of subscriber identities and subscriber voice prints and telephony services associated with said subscriber identities;

receiving a phone call from a subscriber from an originating device connected to a public switched telephone network connected to the computer communications network via a media gateway;

determining by switching systems within the public switched telephone network that the phone call is to be routed to the media gateway based on a called number specified by the phone call;

translating the called number to a network address by the media gateway;

obtaining a voice sample from the subscriber;

packetizing by the media gateway the voice sample received from the subscriber over the public switched telephone network for communication over the computer communications network;

identifying a voice print from the voice sample by a voice server connected to the computer communications network, the voice print uniquely identifying the subscriber;

determining a subscriber identity according to the identified voice print by comparing the identified voice print with the subscriber voice prints stored in the database, the determination being made by the voice server, the voice server being communicatively linked to the database;

during a telephone call in which said subscriber participates, activating a telephony service executing on a telephony application server connected to the computer communications network, wherein the telephony service is associated with said subscriber according to said determined subscriber identity and wherein the telephony service is activated in response to the determining of the subscriber identity based upon the voice print identification; and charging a fee for the telephony service activated during the telephone call, the fee being charged by the telephony application server to an account associated with said subscriber according to said determined subscriber identity.

5. The non-transitory computer-readable storage of claim 4, wherein identifying information is determined from a spoken utterance of the subscriber and said identifying information specifies said activated telephony service.

6. The non-transitory computer-readable storage of claim 4, further including billing the subscriber for services which the subscriber has utilized from said telephone service.

* * * * *